(12) United States Patent
Wong et al.

(10) Patent No.: US 7,265,793 B2
(45) Date of Patent: Sep. 4, 2007

(54) METHOD AND SYSTEM FOR DETECTING DIGITAL QAM, VSB AND ANALOG TV SIGNALS

(75) Inventors: Jorge J. Wong, Mission Viejo, CA (US); Donald G. McMullin, Laguna Hills, CA (US); Frederick G. Walls, Norristown, PA (US); Thomas L. Spieker, San Juan Capistrano, CA (US)

(73) Assignee: Broadcom Corporation, Irvine, CA (US)

( * ) Notice: Subject to any disclaimer, the term of this patent is extended or adjusted under 35 U.S.C. 154(b) by 464 days.

(21) Appl. No.: 10/864,120

(22) Filed: Jun. 9, 2004

(65) Prior Publication Data

US 2005/0179818 A1    Aug. 18, 2005

Related U.S. Application Data

(60) Provisional application No. 60/545,779, filed on Feb. 17, 2004.

(51) Int. Cl.
*H04N 7/084*    (2006.01)
(52) U.S. Cl. .................................. 348/558
(58) Field of Classification Search ........ 348/554–558, 348/731–733, 725; 375/326, 316
See application file for complete search history.

(56) References Cited

U.S. PATENT DOCUMENTS

| 5,557,337 A | * | 9/1996 | Scarpa | 348/558 |
| 6,519,298 B1 | * | 2/2003 | Kim | 375/343 |
| 6,963,623 B2 | * | 11/2005 | Ninomiya et al. | 375/326 |
| 6,980,913 B2 | * | 12/2005 | Meir | 702/77 |

* cited by examiner

*Primary Examiner*—Michael H. Lee
(74) *Attorney, Agent, or Firm*—McAndrews Held & Malloy Ltd.

(57) ABSTRACT

A method and system is provided, which may detect digital QAM, VSB and analog TV signals in a faster and more efficient manner than conventional systems. The system and method may be deployed in, for example, cable TV set-top boxes, cable TV modems and television set receivers, which may be coupled to a cable TV or off-the-air terrestrial network. Power measurements of the RF carriers found in a cable TV channel may be utilized to determine whether a digital QAM signal, digital VSB signal, or an analog signal is present in a TV channel. In this regard, it is not necessary for a receiver to demodulate, lock, synchronize, decode and/or validate any video or audio information or digital bit stream in order to detect digital QAM, digital VSB and analog TV signals, or not signal at all. Accordingly, the process of detecting digital QAM, digital VSB and analog TV signals is shortened and simplified.

62 Claims, 5 Drawing Sheets

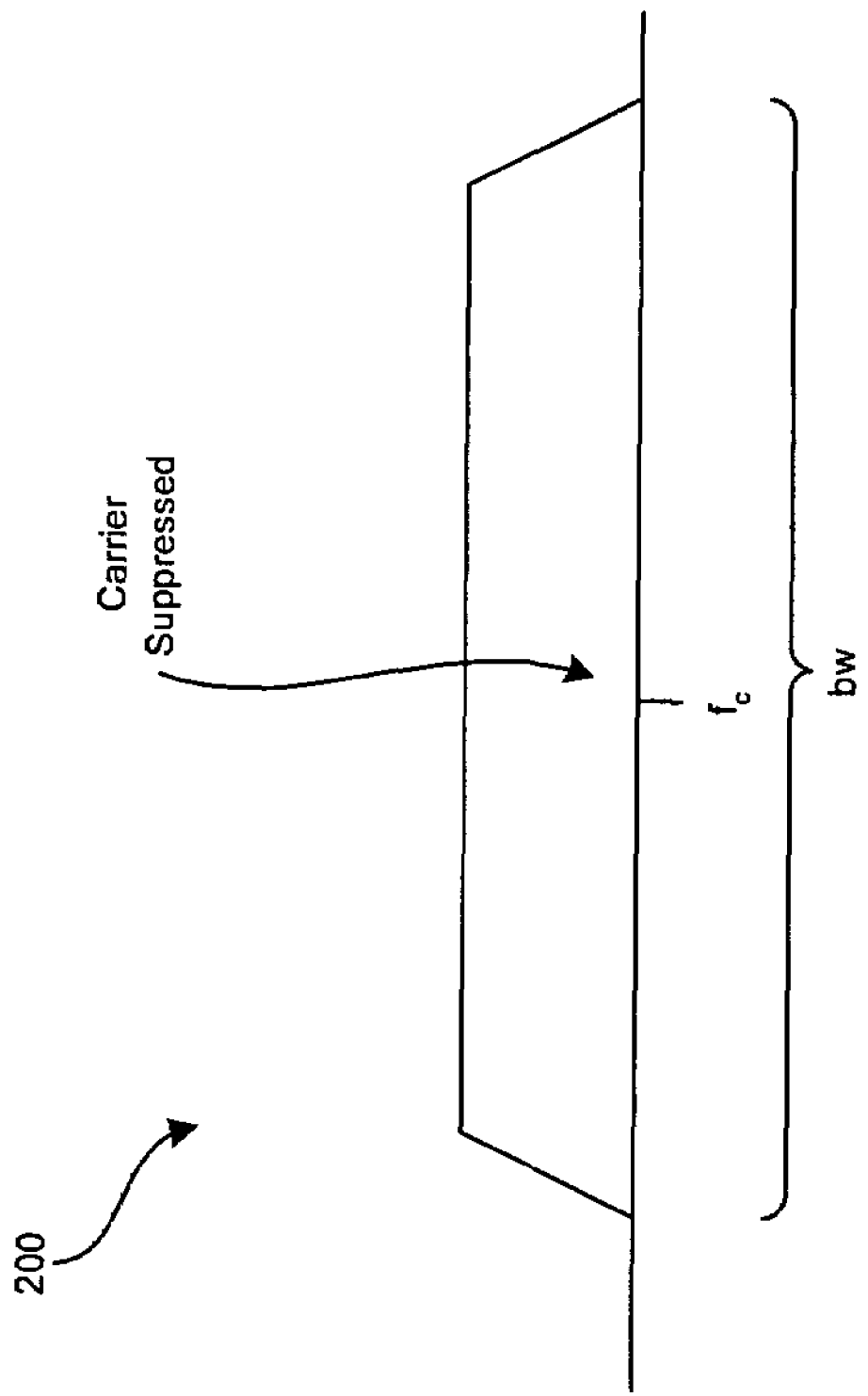

METHOD AND SYSTEM FOR DETECTING DIGITAL QAM, VSB AND ANALOG TV SIGNALS

CROSS-REFERENCE TO RELATED APPLICATIONS/INCORPORATION BY REFERENCE

This application makes reference to, claims priority to and claims the benefit of:

U.S. Provisional Application Ser. No. 60/545,779 filed on Feb. 17, 2004.

This application also makes reference to:

U.S. application Ser. No. 10/774,037 filed Feb. 6, 2004, titled method and system for a vestigial side band (VSB), quadrature amplitude modulation (QAM), NTSC, out-of-band (OOB) receiver.

The above stated applications are hereby incorporated herein by reference in their entirety.

FIELD OF THE INVENTION

Certain embodiments of the invention relate to the processing of television (TV) signals. More specifically, certain embodiments of the invention relate to a method and system for detecting digital quadrature amplitude modulation (QAM), vestigial side band (VSB) and analog television signals.

BACKGROUND OF THE INVENTION

Television (TV) networks have traditionally utilized analog signal formats to carry video and audio channels to television viewers or subscribers. All the television signals may each be modulated at a different radio frequency (RF) and combined or multiplexed for transmission over the terrestrial air or a hybrid fiber-coaxial cable network. The customer premise equipment (CPE), such as a TV set or cable set-top box converter, receives all such signals combined, and tunes to a particular frequency in order to display the TV channel desired by the viewer.

With various advancements in digital communications and the introduction of digital television (DTV), TV network providers have been replacing or otherwise upgrading their transmission and distribution systems to provide new and/or better quality services to their viewers or paid subscribers. In addition to transmitting analog signals, the infrastructure of these upgraded or new systems are also adapted to facilitate the generation and transmission of various digital formats that provide superior picture and sound quality, higher channel capacity, high-speed Internet data services, voice services and/or interactive services. Given the size of existing television infrastructure, television network providers must also provide support for legacy systems, and therefore, provide support for both analog and digital television systems.

Since a plurality of analog and/or digital channels are multiplexed onto and transmitted by the TV network provider infrastructure, the CPE must have the capability to detect or discriminate whether a signal is in analog format or digital format. Once an incoming signal for a channel is determined to be either in digital or analog format, the proper demodulation or decoding scheme is utilized to process the channel.

Current analog TV signals are defined primarily by the National Television Standards Committee (NTSC), the Phase Alternative Line (PAL) or the Sequential Couleur Avec Memoire (SECAM) systems, and used in different countries around the world. An analog TV signal utilizes mainly two RF carriers, combined in the same channel band. One carrier may commonly be amplitude modulated (AM) with video content, and the other may be frequency modulated (FM) with audio. In operation, an analog TV receiver must adjust the signal power, separate the video and audio carriers, and lock to each carrier in order to down-convert the signals to baseband. The baseband video signal may then be decoded and displayed by achieving horizontal and vertical synchronization and extracting the luminance and color information. After demodulating the received signal, the resulting baseband audio may be decoded, and left, right, surround channels and/or other information may be extracted.

Current digital TV signals utilizes a plurality of modulation techniques for transmitting and receiving packetized information comprising one or more digitized and compressed TV programs, Internet data and/or voice data. A digital TV signal utilizes primarily one RF carrier that is modulated with either quadrature amplitude modulation (QAM) of different levels including quaternary phase shift keying (QPSK), or vestigial sideband (VSB) modulation, among other schemes. A digital TV receiver must adjust the signal power, lock to the carrier, and down-convert it to baseband. The baseband digital signal is demodulated choosing QAM or VSB schemes by trying both, error corrected, and synchronized as a valid bit stream. The bit stream is further decompressed to reproduce the picture and sound, or processed as Internet data or voice data.

In a conventional TV CPE, after tuning to a channel frequency, the TV set or set-top box normally detects whether a channel contains an analog or digital signal, or any signal at all, by performing many of the receiving functions outlined above. If the receiver successfully creates and validates a bit stream from the RF carrier, then it found a digital QAM or VSB signal. If a receiver successfully locks to the video and audio carriers, then it found an analog TV signal. Otherwise it found no signal at all. This process is relatively long and causes delays when scanning TV channels.

In a cable modem used for receiving Internet data, the cable modem receiver must detect only digital QAM signals. When a cable modem has to wait until a valid bit stream is created for each detection attempt, the usual latency associated with a connection increases. Furthermore, the latency due to the waiting process is further exacerbated when the modem has to scan all the available RF channels in order to determine which RF channel contains the appropriate Internet information.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention may be found in a method and system for processing signals in a television system. The method may comprise receiving a signal comprising one or more television channels and determining power of RF carriers in a television channel. Without demodulating, synchronizing, decoding and/or validating data in the received signal, a determination may be made as to whether the television channel comprises a digital component or an analog component. This latter determination may be based upon the determined power of RF carriers in the television channel. The digital component may comprise a quadrature amplitude modulated (QAM) or vestigial sideband (VSB) modulated signal.

After tuning to the television channel, it may be determined whether an applied power gain is a maximum power gain. A determination that the applied power gain is a maximum power gain indicates that there is no signal in the television channel. It may also be determined whether an applied power gain is less than a maximum power gain but greater than or equal to a minimum power gain. If the applied power gain is less than the maximum power gain but greater than or equal to a minimum power gain, it may be determined whether the digital component or the analog component is present in the television channel.

In order to determine whether the digital component or the analog component is present in the television channel, a relative power may be measured at $f_c$, where $f_c$ is a center frequency of the television channel. A measurement of relative power at $f_c$ that is greater than or equal to a specified threshold indicates that the digital component is present in the television channel. A measurement of relative power at $f_c$ that is less than a specified threshold indicates that the analog component is present in the television channel.

In order to determine whether the digital component present in the television channel is QAM or VSB modulated, a relative power may be measured at $f_p$, where $f_p$ is a frequency of a pilot tone that may be used in VSB modulated signals. A measurement of relative power at $f_p$ that is greater than or equal to a specified threshold indicates that the VSB digital component is present in the television channel. A measurement of relative power at $f_p$ that is less than a specified threshold indicates that the QAM digital component is present in the television channel.

In order to determine whether the digital component or the analog component is present in the television channel, a relative power may be measured at $f_v$, where $f_v$ is a video carrier frequency of the television channel. A measurement of relative power at $f_v$ that is greater than or equal to a specified threshold, and a determination that there is no measured relative power at a center frequency $f_c$, indicates that the analog component is present in the television channel.

In order to determine whether the digital component or the analog component is present in the television channel, a relative power may also be measured at $f_a$, where $f_a$ is an audio carrier frequency of the television channel. A measurement of relative power at $f_a$ that is greater than or equal to a specified threshold, and a determination that there is no measured relative power at a center frequency $f_c$ indicates that the analog component is present in the television channel. Other aspects of the invention may further comprise rejecting interfering signals at the center frequency $f_c$, video carrier $f_v$, and audio carrier $f_a$ for the television channel. In this regard, the interfering signals may be filtered out.

Another embodiment of the invention may provide a machine-readable storage, having stored thereon, a computer program having at least one code section executable by a machine, thereby causing the machine to perform the steps as described above for processing signals in a television system.

Aspects of the system for processing signals in a television system may comprise a receiver that receives a signal comprising at least one television channel. The receiver may comprise an automatic gain control (AGC) that may be adapted to determine power of RF carriers in the television channel. The receiver may comprise circuitry that determines whether one of the television channels comprise a digital component or an analog component based on the determined power of RF carriers in the at least one television channel without demodulating, synchronizing, decoding or validating data in the received signal. The receiver may further comprise a tuner that has the capability to tune to the television channel. The digital component may be a QAM signal. The circuitry may comprise at least one filter and/or at least one equalizer.

The automatic gain control (AGC) may be configured to determine whether an applied power gain is a maximum power gain. If the applied power gain is a maximum power gain, a processor may be utilized to indicate that there is no signal in the television channel. The automatic gain control (AGC) may further determine whether an applied power gain is less than a maximum power gain but greater than or equal to a minimum power gain. The circuitry may determine whether the digital component or the analog component is present in the at least one of the television channel, if the applied power gain is less than the maximum power gain but greater than or equal to a minimum power gain.

The circuitry may be adapted to measure a relative power at $f_c$, where $f_c$ is a center frequency of the television channel, in order to determine whether the digital component or the analog component is present in the television channel. A processor may indicate that the digital component is present in the television channel, if the measured relative power at $f_c$ is greater than or equal to a specified threshold. The processor may indicate that the analog component is present in the television channel, if the measured relative power at $f_c$ is less than a specified threshold.

In order to determine whether the digital component present in the television channel is QAM or VSB modulated, the circuitry may be adapted to measure a relative power at $f_p$, where $f_p$ is a frequency of a pilot tone that may be used in VSB modulated signals. In the processor determines that a measurement of relative power at $f_p$ is greater than or equal to a specified threshold, then the processor may indicate that the VSB digital component is present in the television channel. If the processor determines that a measurement of relative power at $f_p$ is less than a specified threshold, then the processor may indicate that the QAM digital component is present in the television channel.

The circuitry may determine a relative power at $f_v$, where $f_v$ is a video carrier frequency of the television channel, in order to determine whether the digital component or the analog component is present in the television channel. A processor may indicate that the analog component is present in the television channel, if the measured relative power at $f_v$ is greater than or equal to a specified threshold, and there is no measured relative power at a center frequency $f_c$.

The circuitry may be configured to measure a relative power at $f_a$, where $f_a$ is an audio carrier frequency of the television channel, in order to determine whether the digital component or the analog component is present in the television channel. The processor may indicate that the analog component is present in the television channel, if the measured relative power at $f_a$ is greater than or equal to a specified threshold, and there is no measured relative power at a center frequency $f_c$. The system may further comprise at least one filter that may be adapted to reject interfering signals at a center frequency $f_c$, video carrier $f_v$, and audio carrier $f_a$ of the television channel. The filter may be, for example, a notch filter, which may comprise automatic amplitude control.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 2a is a diagram of the RF spectrum of a digital QAM signal, which may be utilized in connection with detecting digital quadrature amplitude modulation (QAM), digital vestigial sideband (VSB) modulation, and analog television signals, in accordance with an embodiment of the invention.

DETAILED DESCRIPTION OF THE INVENTION

One aspect of the invention provides a method and system, which may be utilized to detect digital QAM, VSB and analog TV signals in a faster and more efficient manner than conventional systems. QAM may include a quaternary phase shift keying. The system and method may be deployed in, for example, cable TV set-top boxes, cable television modems, and television set receivers, which may be coupled to a cable TV or off-the-air terrestrial network. Aspects of the invention may utilize actual power measurements or estimated power measurements of the RF carriers found in a TV channel to determine whether a digital QAM signal, a digital VSB signal, or an analog signal is present in a TV channel. In this regard, it is not necessary for a receiver to demodulate, lock, synchronize, decode or validate any video or audio information or digital bit stream in order to detect digital QAM, digital VSB and analog TV signals. Therefore, the process of detecting digital QAM, digital VSB and analog TV signals is shortened and simplified. In one embodiment of the invention, the existing hardware components may be used to adjust the power and demodulate digital QAM or VSB signals in a TV set or cable receiver. However, new software may be utilized to control the conventional software to provide detection of digital QAM, VSB and analog TV signals in accordance with the various aspects of the invention. Notwithstanding, implementation cost may remain low since additional hardware may not be required for implementation.

Figure 1:
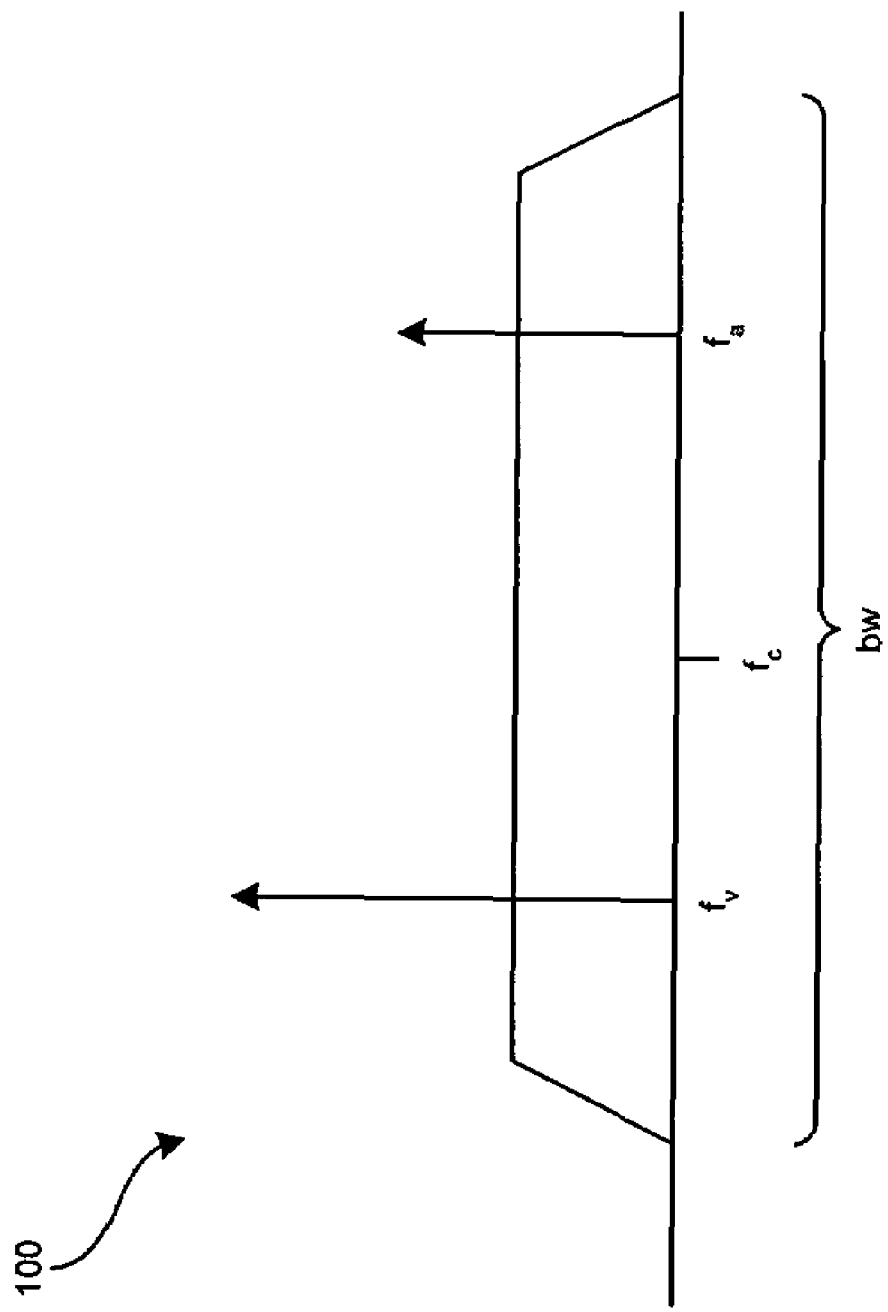
FIG. 1 is a diagram of the RF spectrum of an analog TV signal, which may be utilized in connection with detecting digital quadrature amplitude modulation (QAM), digital vestigial sideband (VSB) modulation, or analog television signals in a television channel, in accordance with an embodiment of the invention.

FIG. 1 is a diagram of the RF spectrum 100 of an analog TV signal, which may be utilized in connection with detecting digital quadrature amplitude modulation (QAM), digital vestigial sideband (VSB) modulation, or analog television signals in a television channel, in accordance with an embodiment of the invention. Referring to FIG. 1, there is shown video carrier $f_v$, center frequency $f_c$ and audio carrier $f_a$. The video carrier may be located at frequency $f_v$ and the audio carrier may be located at frequency $f_a$. The video carrier $f_v$ and audio carrier $f_a$ are distinguishable as the left and right peaks, respectively, even though they may be modulated with picture, sound and/or other information. In a NTSC broadcast system, for example, the entire analog TV signal of FIG. 1 may occupy 6 MHz of bandwidth (bw). The video carrier ($f_v$) may be −1.75 MHz to the left of the center frequency ($f_c$) of the channel, and the audio carrier ($f_a$) may be +2.75 MHz to the right of the center of the channel. In a PAL broadcast system, for example, the entire analog TV signal may occupy 8 MHz of bandwidth. In this case, the video carrier may be −2.75 MHz to the left of the center of the channel, and the audio carrier may be +2.75 MHz to the right of the center of the channel. Although the NTSC signal occupies a 6 MHz of bandwidth and the PAL signal occupies a bandwidth of 8 MHz, the invention is not limited in this regard. Accordingly, the invention may be applicable to other signals bearing different bandwidth configurations, which may, for example, be utilized in other countries and/or in the future.

FIG. 2a is a diagram of the RF spectrum 200 of a digital QAM signal, which may be utilized in connection with detecting digital quadrature amplitude modulation (QAM), digital vestigial sideband (VSB) modulation, and analog television signals, in accordance with an embodiment of the invention. The single carrier is in the center (fc) of the channel but it is suppressed. In the NTSC system, the entire signal occupies 6 MHz of bandwidth (bw), and in the PAL system, 8 MHz.

Figure 2B:
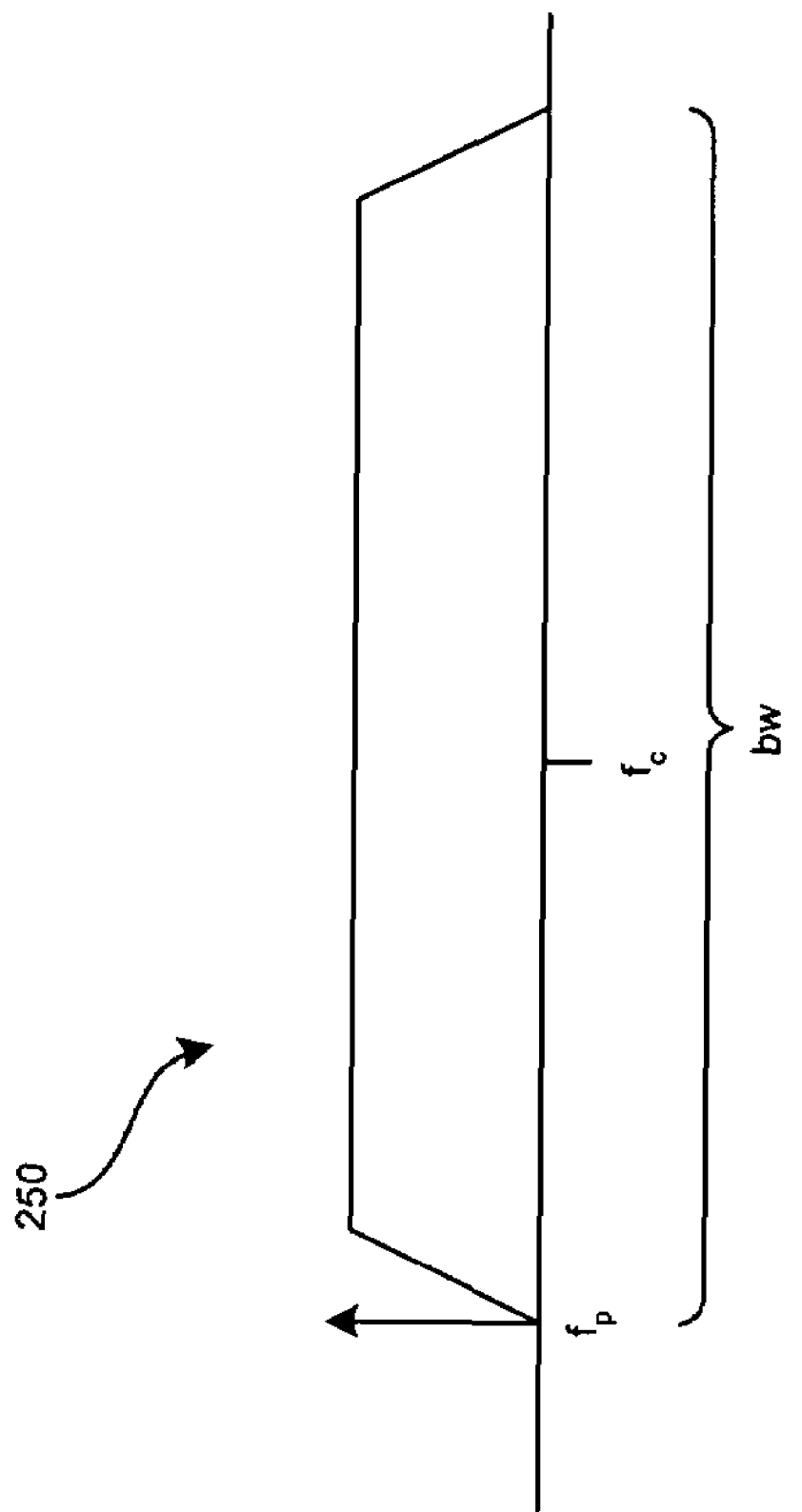
FIG. 2b is a diagram of the RF spectrum of a digital VSB signal, which may be utilized in connection with detecting digital quadrature amplitude modulation (QAM), digital vestigial sideband (VSB) modulation, and analog television signals, in accordance with an embodiment of the invention.

FIG. 2b is a diagram of the RF spectrum 250 of a digital VSB signal, which may be utilized in connection with detecting digital quadrature amplitude modulation (QAM), digital vestigial sideband (VSB) modulation, and analog television signals, in accordance with an embodiment of the invention. The main carrier is in the center (fc) of the channel but it is suppressed. The pilot tone may be located at frequency $f_p$, near the edge of the spectrum. In the NTSC system, the entire signal occupies 6 MHz of bandwidth (bw), and in the PAL system, 8 MHz.

Figure 3:
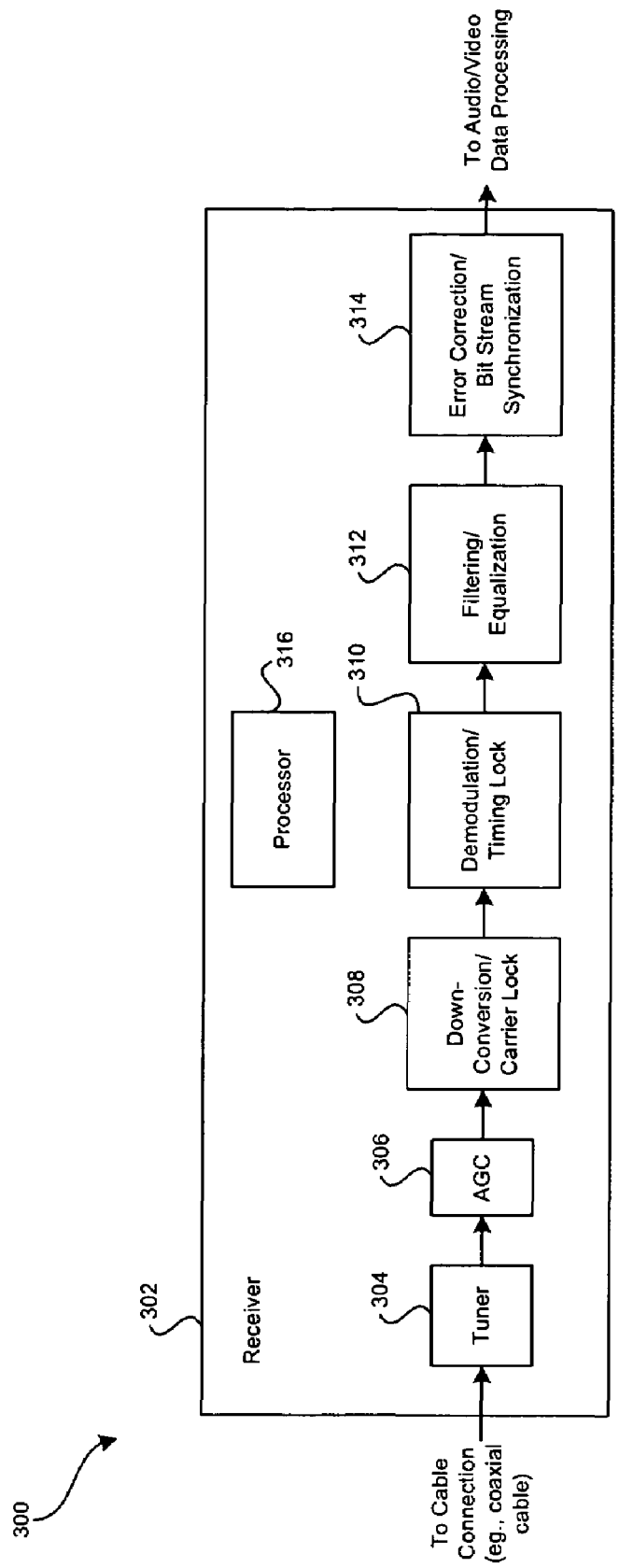
FIG. 3 is a block diagram of a digital QAM or digital VSB receiver, which may be utilized in connection with detecting digital quadrature amplitude modulation (QAM), digital vestigial sideband (VSB) modulation, and analog television signals, in accordance with an embodiment of the invention.

FIG. 3 is a block diagram 300 of a digital QAM or digital VSB receiver 302, which may be utilized in connection with detecting digital quadrature amplitude modulation (QAM), digital vestigial sideband (VSB) modulation, and analog television signals, in accordance with an embodiment of the invention. Referring to FIG. 3, there is shown a tuner block 304, an automatic gain control (AGC) block 306, a down-conversion/carrier lock block 308, a demodulation/timing block 310, a filtering/equalization block 312, an error correction/bit stream synchronization block 314 and a processor 316. The tuner block 304 output signal is provided as an input to the AGC block and the error correction/bit stream synchronization block generates output video, audio and/or data signals for processing.

The tuner block 304 may comprise suitable logic, circuitry and/or code that may be adapted to pass signals in a desired frequency range and reject signals which are out of the desired frequency range. Accordingly, the tuner block 304 may comprise one or more passband filters for passing signals in the desired range and rejecting signals outside of the desired range. The tuner may be connected directly to, for example, a cable television wall outlet via, for example, a coaxial cable, or an off-the-air television antenna.

The automatic gain control block 308 may comprise suitable logic, circuitry and/or code that may be adapted to adjust the signal power coming from the output of the tuner block 304. The automatic gain control block 308 may be adapted to determine the power level or gain of the received signal in an RF channel.

The down-conversion/carrier lock block 308, may comprise suitable logic, circuitry and/or code that may be adapted to down-convert and lock to the carrier of the signal received from the automatic gain control block 308.

The demodulation/timing block 310, may comprise suitable logic, circuitry and/or code that may be adapted to demodulate and lock to the timing of the signal that may be received from the down-conversion/carrier lock block 308.

The filtering/equalization block 312, may comprise suitable logic, circuitry and/or code that may be adapted to filter and equalize the demodulated signal in order to mitigate amplitude and phase distortion which may occur during transmission over the air or cable distribution plant. The filtering/equalization block 312 may comprise a feed forward equalizer (FFE) and/or decision feedback equalizer (DFE) block, for example.

The error correction/bit stream synchronization block 314, may comprise suitable logic, circuitry and/or code that may be adapted to detect and correct any errors may occur in a received bit stream. The error correction/bit stream synchronization block 314, may comprise, for example, a forward error correction (FEC) block.

The processor 316 may be a microprocessor or controller that may be adapted to control the tuner block 304, automatic gain control (AGC) block 306, down-conversion/carrier lock block 308, demodulation/timing block 310, filtering/equalization block 312, and/or error correction/bit stream synchronization block 314. In this regard, software may be utilized by the processor to handle or control the receiver 302.

In operation, after the tuner block 304 tunes to a particular television channel, and the automatic gain control (AGC) block 306 may adjust a signal power coming from an output of the tuner block 304. After gain adjustment, the down-conversion/carrier lock block 308 of the receiver 302 locks on to the carrier in order to down-convert the signal to baseband and for proper signal demodulation. The filtering/equalization block 310 may be utilized to compensate for distortions and interference that may occur in the channel. The error correction/bit stream synchronization block 314 of receiver 302 may correct any bit errors where possible, and/or may synchronize the data in order to produce a valid bit stream comprising video, audio and/or data for processing.

In an embodiment of the invention, the processor 316, the automatic gain control block 306 and/or the filtering/equalization block 312, for example, of the receiver 302 of FIG. 3, may be adapted to detect whether a channel contains a digital component such as the digital QAM signal of FIG. 2*a* or the digital VSB signal of FIG. 2*b*, or an analog component such as the analog TV signal of FIG. 1, or no signal at all. After the receiver 302 tunes to a frequency for the channel, the automatic gain control 306 may determine whether there is a signal present in the channel. A power gain applied by the automatic gain control block 306 may be representative of whether there is a signal present in the channel. If the automatic gain control block 306 indicates that it is providing or operating at its maximum level of power gain, then this may indicate that there is no signal in the channel. If the automatic gain control block 306 indicates that it may be providing gain between, but not including, its minimum and maximum levels, then this may indicate that there is a signal present in the channel. Accordingly, the type of signal, whether analog or digital component signal may be determined.

The filtering/equalization block 312, for example, may be utilized to determine whether the channel contains a digital QAM, VSB or analog TV signal. In this regard, the filtering/equalization block 312 may be utilized to measure the relative power present at the center frequency $f_c$ in a digital QAM signal and pilot frequency $f_p$ in a digital VSB signal, or at video carrier $f_v$ and audio carrier $f_a$ in an analog TV signal. If the channel has significant power at $f_c$, then it contains a digital QAM or digital VSB signal, since an analog TV signal does not contain significant power at $f_c$. If the channel has significant power at $f_p$, then it contains a digital VSB signal. If the channel does not have significant power at $f_c$, then the channel it contains an analog TV signal. For further optional verification of the presence of an analog TV signal in the channel, in case there is any other type of signal in the channel, the power at the video carrier $f_v$ and optionally at the audio carrier $f_a$ may also be determined. If there is significant power at the video carrier $f_v$ and optionally at the audio carrier $f_a$, but not at the center frequency $f_c$, then the channel contains an analog TV signal.

Depending on the implementation of the filtering/equalization block 312 of the QAM or VSB receiver 312, power at a particular frequency, for example, $f_c$, $f_p$, $f_v$ or $f_a$, may be determined by measurement using at least one of a plurality of devices and/or methodologies. For example, a notch filter comprising automatic amplitude control may be utilized to measure the power at $f_c$, $f_p$, $f_v$ or $f_a$. In one embodiment of the invention, software may be utilized to program a device such as a filter to reject a signal interferer at $f_c$, $f_p$, $f_v$ and/or $f_a$, with a narrow bandwidth of a few kilohertz (KHz). The amplitude of the notch filter may be directly related to the power of the signal that the filter may be rejecting. If the amplitude of the notch filter is relatively large at $f_c$, $f_p$, $f_v$ and/or $f_a$, then there may be a signal carrier at $f_c$, $f_p$, $f_v$ or $f_a$ respectively.

In another embodiment of the invention, the power at a certain frequency may be determined by, for example, a spectrum analyzer. In this regard, the spectrum analyzer may compute a Fast Fourier Transform (FFT) of the signal and measure the power of the signal at a plurality of discrete frequencies within at least a portion of the signal bandwidth. In this regard, software may be utilized to determine or acquire the power measurements at $f_c$, $f_p$, $f_v$ and/or $f_a$ to determine whether the channel contains a digital QAM, VSB or analog TV signal.

Figure 4:
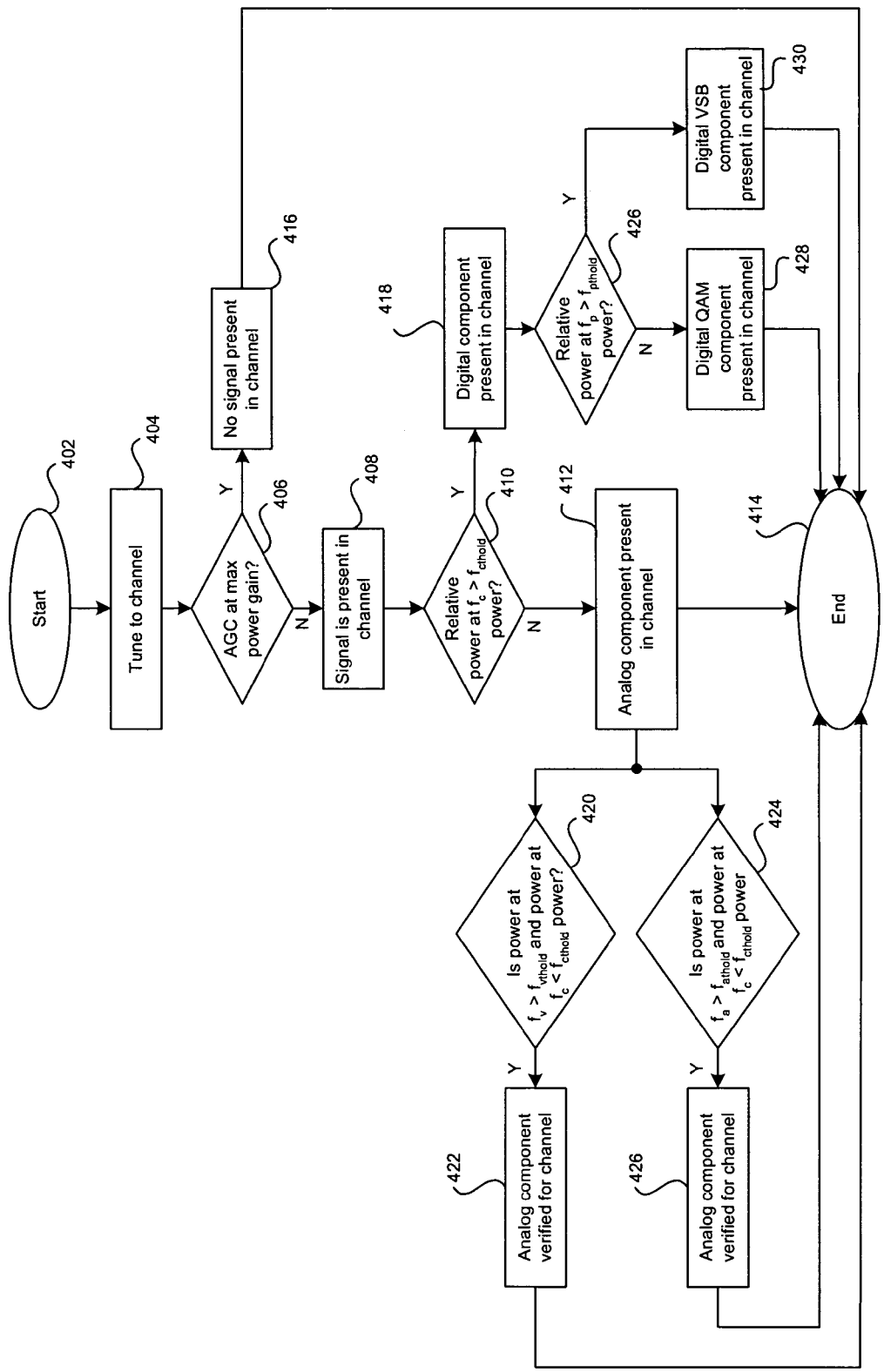
FIG. 4 is a flow chart illustrating exemplary steps that may be utilized for detecting digital quadrature amplitude modulation (QAM), digital vestigial sideband (VSB) modulation and analog signal in a channel or other television channel, in accordance with an embodiment of the invention.

FIG. 4 is a flow chart illustrating exemplary steps that may be utilized for detecting digital quadrature amplitude modulation (QAM) signal, digital vestigial sideband (VSB) modulation signal, and analog signal in a cable television channel or other television channel, in accordance with an embodiment of the invention. The exemplary steps illustrated in the algorithm may be implemented in software, hardware, or any combination thereof. Referring to FIG. 4, the exemplary steps may begin with start step 402. Subsequently, in step 404, the receiver may tune to a channel. In step 404, it may be determined whether an AGC is operating at a maximum power gain. If it is determined that the AGC is operating at the maximum power gain, then in step 416, no signal is present in the channel. In this case, the exemplary steps may end at step 414.

In step 406, if it is determined that the AGC is not operating at the maximum power gain, then in step 408, a signal present in the channel. Subsequently, in step 410, it may be determined whether a relative power at the center frequency $f_c$ is greater than a threshold power for $f_c$ ($f_{cthold}$ power). In step 410, if it is determined that the relative power at the center frequency $f_c$ is greater than or equal to a threshold power for $f_c$ ($f_{cthold}$ power), then a digital component such as a QAM or VSB signal is present in the channel. Subsequently, in step 426, it may be determined whether a relative power at the pilot frequency $f_p$ is greater than a threshold power for $f_p$ ($f_{pthold}$ power).

In step 426, if it is determined that the relative power at the pilot frequency $f_p$ is greater than or equal to a threshold power for $f_p$ ($f_{pthold}$ power), then a digital VSB component is present in the channel. On the other hand, in step 426, if it is determined that the relative power at the pilot frequency $f_p$ is less than a threshold power for $f_p$ ($f_{pthold}$ power), then a digital QAM component is present in the channel. Subsequent to steps 428 and 430, the exemplary steps may end at step 414. In instances where a TV service provider may opt to provide only one of QAM, VSB or other signal in a digital system, step 426 may be skipped or modified. In step 410, if it is determined that the relative power at the center frequency $f_c$ is not greater than or equal to a threshold power for $f_c$ ($f_{cthold}$ power), then an analog component signal is present in the channel. Subsequent to step 412, the exemplary step may end at step 414.

In accordance with an aspect of the invention the exemplary steps 420, 422, 424 and 426 may be optional verification steps. In this regard, the exemplary steps 420, 422, 424 and 426 may be utilized to verify there is indeed an analog component signal present in the channel. Step 420 may be executed subsequently to executing step 412. In step 420, it may be determined whether power at the video carrier $f_v$ is greater than a threshold power ($f_{vthold}$ power) and power at the center frequency $f_c$ is less than the threshold power $f_{cthold}$. If so, then in step 422, an analog component has been verified for the channel. In a similar manner, step 424 may be executed subsequent to executing step 412. In step 424, it may be determined whether power at the audio carrier $f_a$ is greater than a threshold power ($f_{athold}$ power) and power at the center frequency $f_c$ is less than the threshold power $f_{cthold}$. If so, then in step 426, an analog component has been verified for the channel.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a television system, the method comprising:
   receiving a signal comprising at least one television channel;
   determining power of RF carriers in said at least one television channel using at least one relative power measurement at a corresponding RF carrier freguency over a full bandwidth of said at least one television channel; and
   determining whether one of said at least one television channel comprises a digital component or an analog component based on said determined power of RF carriers over said full bandwidth of said at least one television channel, without demodulating, synchronizing, decoding or validating data in said received signal.

2. The method according to claim 1, comprising tuning to said at least one television channel.

3. The method according to claim 1, comprising determining whether an applied power gain is a maximum power gain.

4. The method according to claim 3, comprising, if said applied power gain is a maximum power gain, indicating that there is no signal in said at least one of said television channel.

5. The method according to claim 1, comprising determining whether an applied power gain is less than a maximum power gain but greater than or equal to a minimum power gain.

6. The method according to claim 5, comprising, if said applied power gain is less than said maximum power gain but greater than or equal to a minimum power gain, determining whether said digital component or said analog component is present in said at least one of said television channel.

7. The method according to claim 6, comprising measuring a relative power at $f_c$, where $f_c$ is a center frequency of said at least one of said television channel, for said determining whether said digital component or said analog component is present in said at least one of said television channel.

8. The method according to claim 7, comprising, if said measured relative power at $f_c$ is greater than or equal to a specified threshold, indicating that said digital component is present in said at least one of said television channel.

9. The method according to claim 7, comprising, if said measured relative power at $f_c$ is less than a specified threshold, indicating that said analog component is present in said at least one of said television channel.

10. The method according to claim 6, comprising measuring a relative power at $f_v$, where $f_v$ is a video carrier frequency of said at least one of said television channel, for said determining whether said digital component or said analog component is present in said at least one of said television channel.

11. The method according to claim 10, comprising, if said measured relative power at $f_v$ is greater than or equal to a specified threshold, and there is no measured relative power at a center frequency $f_c$, indicating that said analog component is present in said at least one of said television channel.

12. The method according to claim 6, comprising measuring a relative power at $f_a$, where $f_a$ is an audio carrier frequency of said at least one of said television channel, for said determining whether said digital component or said analog component is present in said at least one of said television channel.

13. The method according to claim 12, comprising, if said measured relative power at $f_a$ is greater than or equal to a specified threshold, and there is no measured relative power at a center frequency $f_c$, indicating that said analog component is present in said at least one of said television channel.

14. The method according to claim 6, comprising measuring a relative power at $f_p$, where $f_p$ is a pilot frequency of said at least one of said television channel, for said determining an identity of said digital component present in said at least one of said television channel.

15. The method according to claim 14, comprising, if said measured relative power at $f_p$ is greater than or equal to a specified threshold power for $f_p$, indicating that a digital VSB component is present in said at least one of said television channel.

16. The method according to claim 14, comprising, if said measured relative power at $f_p$ is less than a specified threshold power for $f_p$, indicating that a digital QAM component is present in said at least one of said television channel.

17. The method according to claim 1, comprising rejecting interfering signals at a center frequency $f_c$, video carrier $f_v$, and audio carrier $f_a$.

18. The method according to claim 17, comprising filtering out said interfering signals.

19. The method according to claim 1, wherein said digital component comprises quadrature amplitude modulated (QAM) signal.

20. The method according to claim 1, wherein said digital component comprises vestigial side band (VSB) signal.

21. A machine-readable storage having stored thereon, a computer program having at least one code section for processing signals in a television system, the at least one code section executable by a machine for causing the machine to perform steps comprising:
receiving a signal comprising at least one television channel;
determining power of RF carriers in said at least one television channel using at least one relative power measurement at a corresponding RF carrier frequency over a full bandwidth of said at least one television channel; and
determining whether one of said at least one television channel comprises a digital component or an analog component based on said determined power of RF carriers over said full bandwidth of said at least one television channel, without demodulating, synchronizing, decoding or validating data in said received signal.

22. The machine-readable storage according to claim 21, comprising code for tuning to said at least one television channel.

23. The machine-readable storage according to claim 21, comprising code for determining whether an applied power gain is a maximum power gain.

24. The machine-readable storage according to claim 23, comprising code for indicating that there is no signal in said at least one of said television channel, if said applied power gain is a maximum power gain.

25. The machine-readable storage according to claim 21, comprising code for determining whether an applied power gain is less than a maximum power gain but greater than or equal to a minimum power gain.

26. The machine-readable storage according to claim 25, comprising code for determining whether said digital component or said analog component is present in said at least one of said television channel, if said applied power gain is less than said maximum power gain but greater than or equal to a minimum power gain.

27. The machine-readable storage according to claim 26, comprising code for measuring a relative power at $f_c$, where $f_c$ is a center frequency of said at least one of said television channel, for said determining whether said digital component or said analog component is present in said at least one of said television channel.

28. The machine-readable storage according to claim 27, comprising code for indicating that said digital component is present in said at least one of said television channel, if said measured relative power at $f_c$ is greater than or equal to a specified threshold.

29. The machine-readable storage according to claim 27, comprising code for indicating that said analog component is present in said at least one of said television channel, if said measured relative power at $f_c$ is less than a specified threshold.

30. The machine-readable storage according to claim 26, comprising code for measuring a relative power at $f_v$, where $f_v$ is a video carrier frequency of said at least one of said television channel, for said determining whether said digital component or said analog component is present in said at least one of said television channel.

31. The machine-readable storage according to claim 30, comprising code for indicating that said analog component is present in said at least one of said television channel, if said measured relative power at $f_v$ is greater than or equal to a specified threshold, and there is no measured relative power at a center frequency $f_c$.

32. The machine-readable storage according to claim 26, comprising code for measuring a relative power at $f_a$, where $f_a$ is an audio carrier frequency of said at least one of said television channel, for said determining whether said digital component or said analog component is present in said at least one of said television channel.

33. The machine-readable storage according to claim 32, comprising code for indicating that said analog component is present in said at least one of said television channel, if said measured relative power at $f_a$ is greater than or equal to a specified threshold, and there is no measured relative power at a center frequency $f_c$.

34. The machine-readable storage according to claim 26, comprising code for measuring a relative power at $f_p$, where $f_p$ is a pilot frequency of said at least one of said television channel, for said determining an identity of said digital component present in said at least one of said television channel.

35. The machine-readable storage according to claim 34, further comprising code for indicating that a digital VSB component is present in said at least one of said television channel, if said measured relative power at $f_p$ is greater than or equal to a specified threshold power for $f_p$.

36. The machine-readable storage according to claim 34, comprising code for indicating that a digital QAM component is present in said at least one of said television channel, if said measured relative power at $f_p$ is less than a specified threshold power for $f_p$.

37. The machine-readable storage according to claim 21, comprising code for rejecting interfering signals at a center frequency $f_c$, video carrier $f_v$, and audio carrier $f_a$.

38. The machine-readable storage according to claim 37, comprising code for filtering out said interfering signals.

39. The machine-readable storage according to claim 21, wherein said digital component comprises a QAM signal.

40. The machine-readable storage according to claim 21, wherein said digital component comprises a vestigial side band (VSB) signal.

41. A system for processing signals in a television system, the system comprising:
 a receiver that receives a signal comprising at least one television channel;
 said receiver comprising automatic gain control (AGC) that determines power of RF carriers in said at least one television channel using at least one relative power measurement at a corresponding RF carrier frequency over a full bandwidth of said at least one television channel; and
 said receiver comprising circuitry that determines whether one of said at least one television channel comprises a digital component or an analog component based on said determined power of RF carriers over said full bandwidth of said at least one television channel, without demodulating, synchronizing, decoding or validating data in said received signal.

42. The system according to claim 41, wherein said receiver comprises a tuner that tunes to said at least one television channel.

43. The system according to claim 41, wherein said automatic gain control (AGC) determines whether an applied power gain is a maximum power gain.

44. The system according to claim 43, comprising a processor that indicates that there is no signal in said at least one of said television channel, if said applied power gain is a maximum power gain.

45. The system according to claim 41, wherein said automatic gain control (AGC) determines whether an applied power gain is less than a maximum power gain but greater than or equal to a minimum power gain.

46. The system according to claim 45, wherein said circuitry determines whether said digital component or said analog component is present in said at least one of said television channel if said applied power gain is less than said maximum power gain but greater than or equal to a minimum power gain.

47. The system according to claim 46, wherein said circuitry measures a relative power at $f_c$, where $f_c$ is a center frequency of said at least one of said television channel, for said determining whether said digital component or said analog component is present in said at least one of said television channel.

48. The system according to claim 47, comprising a processor that indicates that said digital component is present in said at least one of said television channel, if said measured relative power at $f_c$ is greater than or equal to a specified threshold.

49. The system according to claim 47, comprising a processor that indicates that said analog component is present in said at least one of said television channel, if said measured relative power at $f_c$ is less than a specified threshold.

50. The system according to claim 46, wherein said circuitry determines a relative power at $f_v$, where $f_v$ is a video carrier frequency of said at least one of said television channel, for said determining whether said digital component or said analog component is present in said at least one of said television channel.

51. The system according to claim 50, comprising a processor that indicates that said analog component is present in said at least one of said television channel, if said measured relative power at $f_v$ is greater than or equal to a specified threshold, and there is no measured relative power at a center frequency $f_c$.

52. The system according to claim 46, wherein said circuitry measures a relative power at $f_a$, where $f_a$ is an audio carrier frequency of said at least one of said television channel, for said determining whether said digital component or said analog component is present in said at least one of said television channel.

53. The system according to claim 52, comprising a processor that indicates that said analog component is present in said at least one of said television channel, if said measured relative power at $f_a$ is greater than or equal to a specified threshold, and there is no measured relative power at a center frequency $f_c$.

54. The system according to claim 46, wherein said circuitry measures a relative power at $f_p$, where $f_p$ is a pilot frequency of said at least one of said television channel, for said determining an identity of said digital component present in said at least one of said television channel.

55. The system according to claim 54, comprising a processor that indicates that a digital VSB component is present in said at least one of said television channel, if said measured relative power at $f_p$ is greater than or equal to a specified threshold power for $f_p$.

56. The system according to claim 54, comprising a processor that indicates that a digital QAM component is present in said at least one of said television channel, if said measured relative power at $f_p$ is less than a specified threshold power for $f_p$.

57. The system according to claim 41, comprising at least one filter that rejects interfering signals at a center frequency $f_c$, video carrier $f_v$, and audio carrier $f_a$.

58. The system according to claim 57, wherein said at least one filter comprises a notch filter.

59. The system according to claim 58, wherein said notch filter comprises automatic amplitude control.

60. The system according to claim 41, wherein said digital component comprises quadrature amplitude modulated (QAM) signal.

61. The system according to claim 41, wherein said digital component comprises a vestigial side band (VSB) signal.

62. The system according to claim 41, wherein said circuitry comprises at least one filter and at least one equalizer.

* * * * *